United States Patent [19]

Nevins et al.

[11] 4,355,469
[45] Oct. 26, 1982

[54] FOLDED REMOTE CENTER COMPLIANCE DEVICE

[75] Inventors: James L. Nevins, Burlington; Joseph Padavano, Shrewsbury, both of Mass.

[73] Assignee: The Charles Stark Draper Laboratory, Inc., Cambridge, Mass.

[21] Appl. No.: 211,357

[22] Filed: Nov. 28, 1980

[51] Int. Cl.³ .............................................. G01B 5/25
[52] U.S. Cl. ................................. 33/185 R; 33/169 C
[58] Field of Search ............ 33/169 C, 172 D, 185 R, 33/180 R; 403/53; 29/406, 407

[56] References Cited

U.S. PATENT DOCUMENTS 4,202,107  5/1980  Watson ............................. 33/169 C
4,283,153  8/1981  Brendamour ..................... 33/185 R Primary Examiner—Harry N. Haroian
Attorney, Agent, or Firm—Joseph S. Iandiorio

[57] ABSTRACT

A folded remote center compliance device including first and second structures serially connected between a mounting member and an operator member for enabling translational motion and rotational motion of the operator member about a remote center at, near, or beyond the end of the operator member; one of the structures including at least two stages connected in series, each stage including flexure means disposed along radii of a focus, the first of the stages being connected with the other of the structures and a second of the stages being connected with one of the members, the other of the members being connected with the other of the structures, and an intermediate section for interconnecting flexure means in adjacent stages.

9 Claims, 7 Drawing Figures

FOLDED REMOTE CENTER COMPLIANCE DEVICE

FIELD OF INVENTION

This invention relates to a folded remote center compliance device.

BACKGROUND OF INVENTION

A remote center compliance (RCC) device is a passive device for aiding insertion and mating maneuvers in robot machines, docking and assembly equipment. An RCC establishes motion about a remote center typically at, near or beyond the functioning end of the operator member. The RCC includes two structures concatenated or serially interconnected between the operator member and a mounting member. In one type of RCC, disclosed in U.S. Pat. No. 4,098,001, one structure includes flexure means comprised of a number of discrete elements aligned with radii from a center which is the remote center of the device and those elements are relatively inflexible except at specific locations about which major motion occurs. The other structure includes flexure means composed of a number of discrete elements which are parallel to each other and which also have localized motion portions. In another type of RCC as disclosed in U.S. Pat. No. 4,155,169, the two structures each include flexure means which are generally flexible or deformable throughout. In one of the structures the flexure means is arranged along radii from a center and that center typically is not coincident with the remote center of the device.

Present RCC's are only a few inches long and a few inches in diameter and provide accommodation on the order of one tenth of an inch for lateral errors and one degree for angular errors. However, in a number of applications it is desirable to be able to absorb lateral error of a few inches and angular error of ten degrees or more. Initial investigations suggest that the flexure means aligned along radii from a center would be, depending on material and diameter, twenty to fifty inches in length to provide such enlarged accommodation. An RCC of such a size would be unwieldy and impractical if not impossible to use in many applications. Attempts to shorten the RCC by decreasing the length of the radially disposed flexure means results in a severe increase in stiffness since the stiffness increases in inverse proportion to the cube of the length.

SUMMARY OF THE INVENTION

It is therefore an object of this invention to provide an improved RCC with enlarged error tolerance.

It is a further object of this invention to provide such an improved RCC with enlarged error tolerance which is more compact.

It is a further object of this invention to provide such an improved RCC having decreased length without increased stiffness.

It is a further object of this invention to provide such an improved RCC which has greater area for viscous damping.

This invention features a folded remote center compliance device which includes first and second structures concatenated or serially connected between a mounting member and an operating member for enabling translational motion and rotational motion of the operator member about a remote center located at, near, or beyond the end of the operator member. One of the structures includes at least two stages connected in series. Each stage includes flexure means disposed along radii from a focus. A first of the stages is connected with the other of the structures and a second of the stages is connected with one of the members. The other of the members is connected with the other of the structures. An intermediate section interconnects the flexure means in adjacent stages.

In a preferred embodiment the flexure means in each stage includes at least three discrete flexure elements. The flexure elements may be flexible throughout or flexible only at specific portions and relatively inflexible elsewhere. The flexure means in each stage may be disposed along radii from the same focus, or the flexure means in each stage may be disposed along radii each from a different focus. The remote center of the device may be coincident with one of the foci where the foci are not coincident with each other. All of the stages may be formed in a single unit such as a pleated member in which one part of each pleat includes flexure means and the other part an intermediate section.

DISCLOSURE OF PREFERRED EMBODIMENT

Other embodiments will occur from the following description of a preferred embodiment and the accompanying drawings, in which:

FIG. 1 is an axonometric view of a prior art RCC of the type shown in U.S. Pat. No. 4,144,169;

The invention may be accomplished with a folded remote center compliance device with first and second structures serially interconnected between a mounting member and an operator member for enabling translational motion and rotational motion of the operator member about a remote center located at, near, or beyond the operator member. One of the structures includes at least two stages connected in series. Each stage includes flexure means disposed along radii from a focus. The flexure means may include three or more discrete flexure elements or rods aligned with radii from the focus. The first stage is connected with the other structure and the second stage is connected with, for example, the operator member while the other structure is connected with the mounting member. An intermediate section interconnects flexure means in adjacent stages. The flexure means may be flexible throughout as in the case of the RCC type disclosed in U.S. Pat. No. 4,155,169, or may be flexible at specific portions and relatively inflexible elsewhere as with the type of RCC disclosed in U.S. Pat. No. 4,098,001. The radially disposed flexure means in each stage may be disposed along radii from the same focus, or the flexure means in each stage may be disposed along radii from different foci. The remote center of the device may be coincident with one of the foci when there are multiple foci and with the focus when there is but one focus. Stages may be formed all in a single member composed of pleats, in which one part of each pleat includes flexure means and the other part includes an intermediate section.

Figure 1:
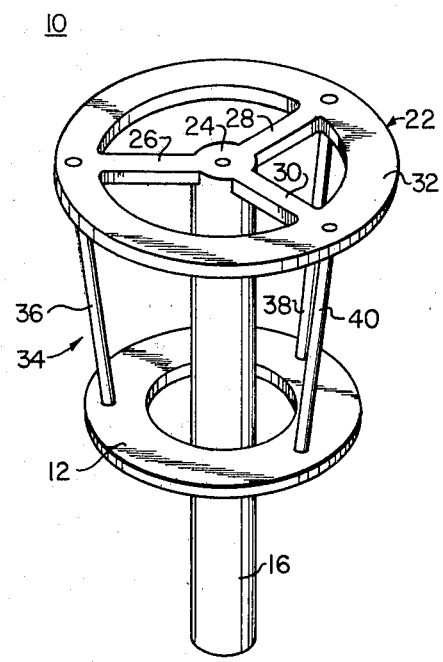

There is shown in FIG. 1 an RCC device 10 supported by mounting plate 12, through which passes operator member 16. RCC device 10 includes a first deformable structure 22, from the central portion of which, 24, is suspended operator member 16. Structure 22 includes three radially extending beams 26, 28, and 30, which are equally spaced and terminate in rigid annular member 32. Member 32 is joined to a second deformable structure 34 which includes flexure means specifically shown as three flexure elements 36, 38, and 40.

Figure 2:
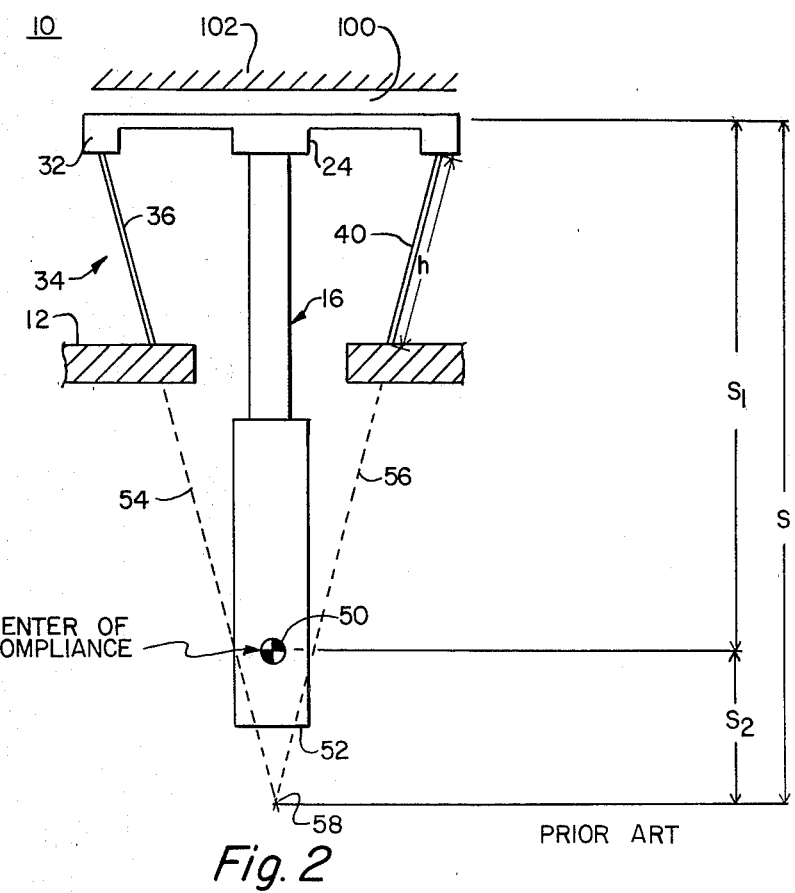
FIG. 2 is a schematic sectional elevational diagram showing certain physical relationships with respect to the RCC of FIG. 1.

RCC device 10 has a remote center of compliance 50, FIG. 2, located near but somewhat above the end 52 of operator member or rod 16. Flexure elements 36, 38 (not shown in FIG. 2), and 40 may be implemented by wires or rods and are disposed along radii 54, 56 of focus 58. The length of elements 36, 38 and 40 are indicated as h, while the distance from the top of device 10 to focus 58 is indicated as S.

Any attempt to decrease the size of device 10, for example by halving the length h, FIG. 2, results in an eightfold increase in the stiffness of the device provided that the wire material, diameter, and all other parameters are held constant, because of the inverse cube relationship between the length of the wires and the stiffness, as shown by equation (1):

$$K_{\theta 2} = \frac{12nS^2 E_2 I_2}{h^3} \tag{1}$$

where:
  $K_{\theta 2}$ = rotational stiffness of the wires
  n = number of wires
  S = wire focal length
  $E_2$ = modulus of the wires
  $I_2$ = moment of inertia of one wire
  h = true wire length Thus to offset the increase in stiffness brought about by halving the length h of the wires, it is necessary to fold the RCC into eight stages.

Figure 3:
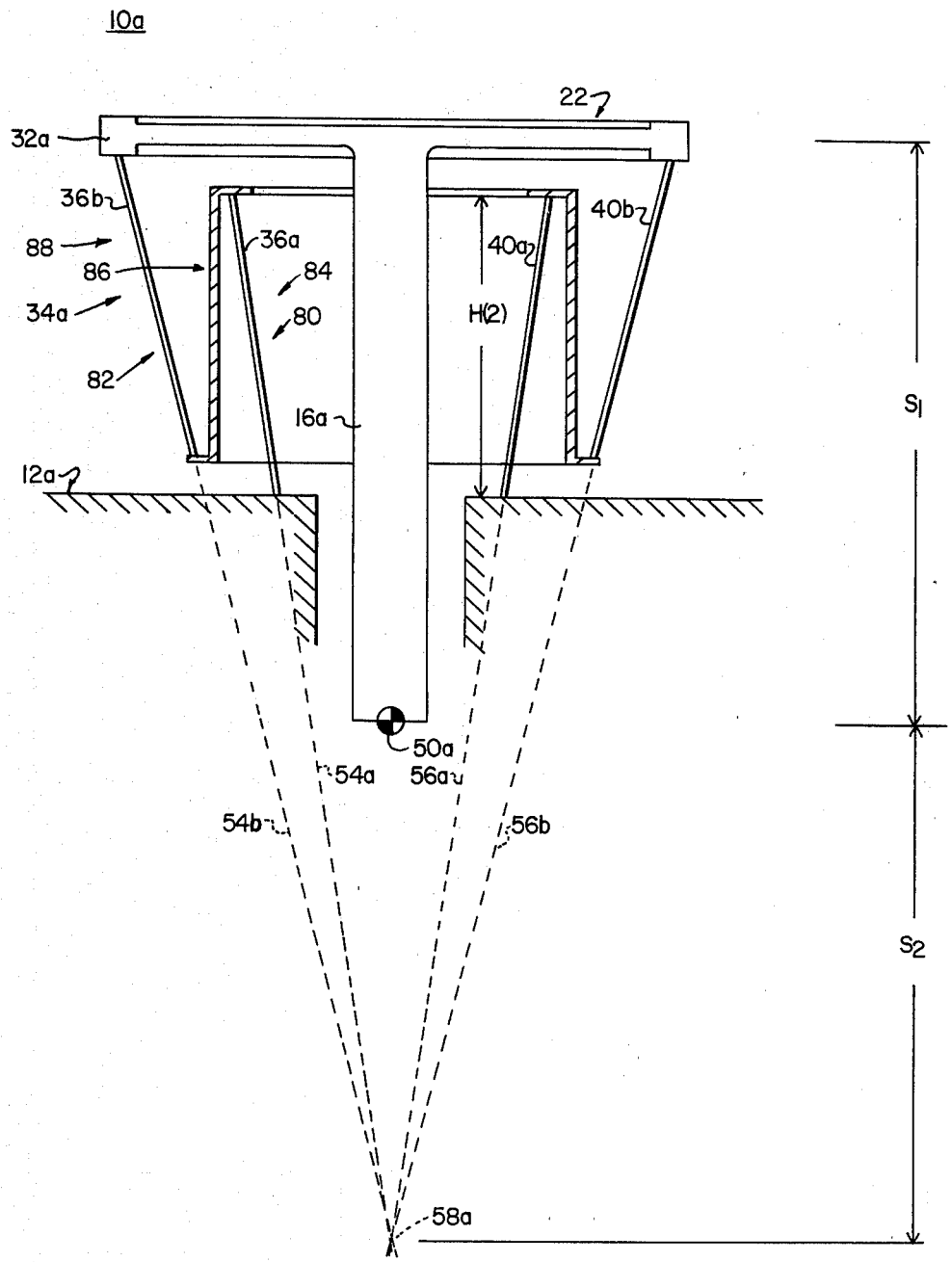
FIG. 3 is a schematic sectional elevational diagram of a folded RCC according to this invention.

One such structure using only two stages, and therefore producing only a fourfold increase in stiffness, is shown in FIG. 3, where like parts have been given like numbers with respect to FIGS. 1 and 2 accompanied by a lower case a or b. Folded RCC device 10a includes two stages 80, 82 in structure 34a. Stage 80 includes flexure means 84 implemented, for example, by three flexure elements, wires 36a, 38a (not shown), and 40a, which are interconnected with mounting member 12a and intermediate section 86. Second stage 82 includes flexure means 88, which includes, for example, three flexure elements or wires 36b, 38b (not shown), and 40b. Flexure elements or wires 36a, 38a, and 40a, in stage 80 of structure 34a lie along radii 54a, 56a emanating from focus 58a. Similarly, flexure elements or wires 36b, 38b, 40b in stage 82 of structure 34a lie along radii 54b, 56b emanating from the same focus 58a.

Figure 4:
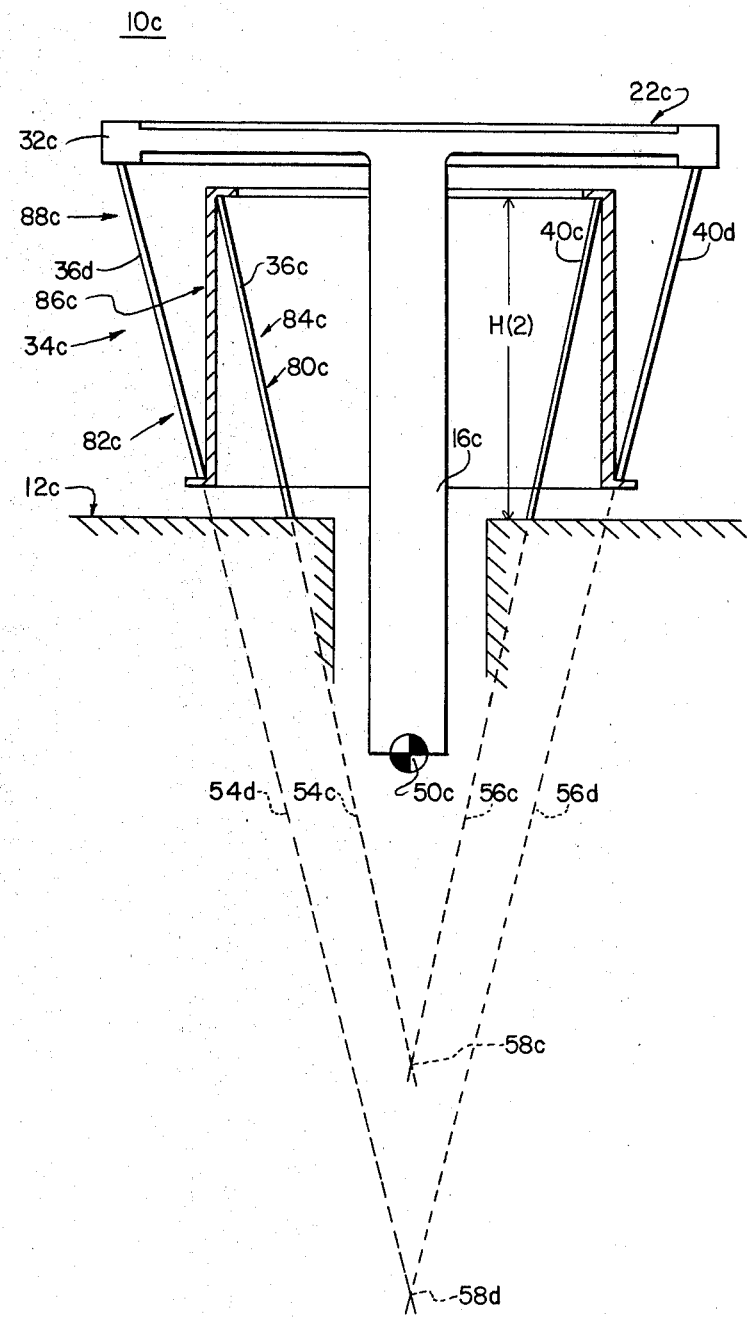
FIG. 4 is a schematic sectional elevational diagram similar to FIG. 3 with each stage having a separate focus.

Alternatively, as shown in FIG. 4, where like parts have been given like numbers with respect to FIG. 3 accompanied by lower case c or d, elements 36c, 38c (not shown) and 40c lie along radii 54c and 56c emanating from focus 58c, while elements 36d, 38d (not shown) and 40d lie along radii 54d and 56d emanating from a different focus 58d.

Figure 5:
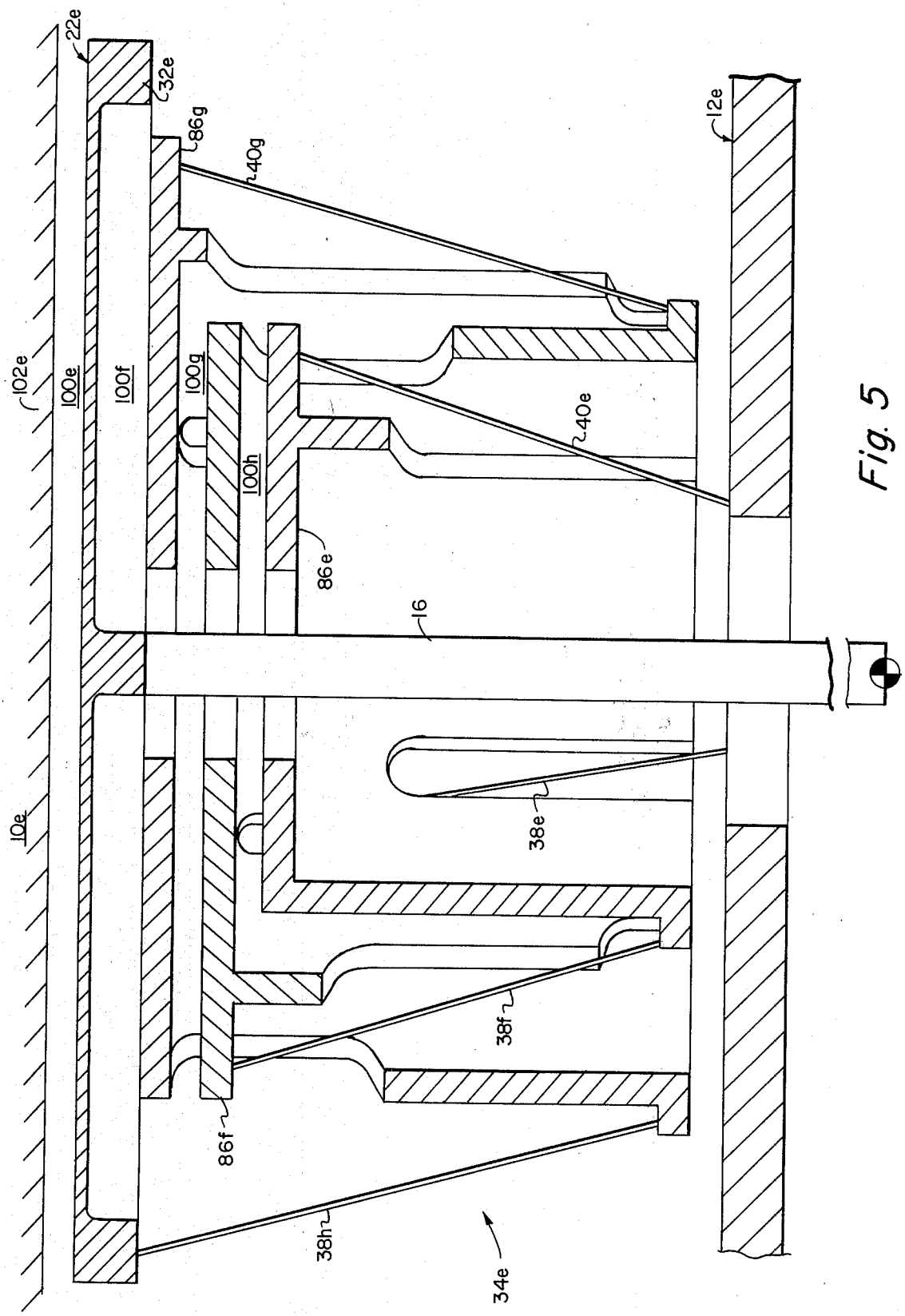
FIG. 5 is a sectional view in elevation of a four-stage folded RCC according to this invention.

A four-stage folded RCC 10e is shown in FIG. 5, where like parts have been given like numbers accompanied by lower case e, f, g, and h. Structure 34e includes four stages. The first stage flexure means is represented by flexure elements or wires 38e, 40e, which extend from mounting plate 12e to intermediate section 86e. The second stage flexure means is represented by wire 38f, which extends from intermediate section 86e to intermediate section 86f. The third stage flexure means is represented by wire 40g which extends from intermediate section 86f to intermediate section 86g, and the fourth stage flexure means is represented by wire 38h, which extends from intermediate section 86g to rigid annular member 32e of structure 22e.

Presently, one method of viscous damping is provided for one-stage RCC's as shown in FIG. 2 by placing grease in the space 100 between the top of structure 22 and a stationary housing 102. In folded RCC 10e, FIG. 5, the volume to receive the viscous damping fluid is increased, for now, in addition to the space 100e between structure 22e and housing 102e, there are provided spaces 100f, 100g, and 100h.

A folded RCC whose length has been halved must be constructed of eight stages in order to maintain the same stiffness. However, with that eight-stage increase, the lateral and angular freedom of the device is approximately doubled. Thus, with a folded RCC of half the length employing eight times the number of stages, the force required to obtain a particular deflection has been maintained constant, but the lateral and angular deflections obtainable with that force are double that of the unfolded RCC.

Thus, for example for a lateral compliance ($K_x$) of five lbs. per inch and an angular compliance of ($K_\theta$) of 100 in-lbs per radian:

|  | Wire length (inches) | Stages | Lateral Freedom (inches) | Angular Freedom (degrees) |
|---|---|---|---|---|
| Unfolded | 2.355 | 1 | 0.133 | 0.86 |
| Folded | 1.178 | 8 | 0.266 | 1.7 | an unfolded RCC having a wire length h of 2.355 in one stage has a lateral freedom of 0.133 inches and angular freedom of 0.86 degrees, while a folded RCC having wire length of one-half of that, or 1.178 inches, with 8 stages has a lateral freedom of 0.266 inches and angular freedom of 1.7 degrees.

The lateral and angular freedom of a specific folded RCC is determined by calculating the stress limit of the wires. For example, the moment in a wire due to the application of force F is:

$$M = -\frac{Fh}{2} \tag{2}$$

The stress in each wire then is equivalent to:

$$\delta = \frac{Mr}{I} \tag{3}$$

where:
  h = true wire length
  r = wire radius $$I = \frac{\pi r^4}{4} = \text{moment of inertia of one wire}$$

Thus the maximum allowable force F equals:

$$F = \frac{\delta \pi r^8}{2h} \quad (4)$$

For three wires, that force is simply 3F. Transferring that force from the top structure 22 to the remote center of compliance 50 is:

$$F_c = 3F \frac{S}{S_2} \quad (5)$$

where:

S = focal length of wires $S_2$ = distance from center of compliance to focus

The lateral deflection of the RCC when this force is applied is:

$$\delta = \frac{F_c}{K_x} \quad (6)$$

The moment about the remote center of compliance 50 due to 3F is:

$$M_c = 3FS_1 \quad (7)$$

so that the angular deflection due to this moment is:

$$\theta = \frac{M_c}{K} \quad (8)$$

This explanation assumes that each stage is approximately equal. However, this is not a necessary limitation of the invention as different stages may be purposely designed to have different stiffnesses and lateral and angular freedom.

The variation of the maximum allowable axial loads on the wires and of the lateral and angular freedom with variations in the number of stages and the wire diameter is shown in Table I for a folded RCC having a height of ten inches and a diameter of twenty inches; a lateral compliance, $K_x$, of five pounds per inch; angular compliance, $K_\theta$ of 100 inch-pounds per radian; and length, $S_1$, equal to twenty inches.

TABLE I

| Number of Stages | Wire Diam. | Lateral ($\delta$) Max. (Inches) | Angular ($\theta$) Max. (Degrees) | Max. Axial Load (Wires Only) (Lbs.) |
|---|---|---|---|---|
| 1 | .052 | 2.3 | 6.4 | 510 |
| 2 | .062 | 3.9 | 10.7 | 725 |
| 3 | .068 | 5.3 | 14.5 | 872 |
| 4 | .073 | 6.7 | 18.2 | 1004 |
| 8 | .086 | 11.2 | 30.5 | 1394 |

Figure 6:
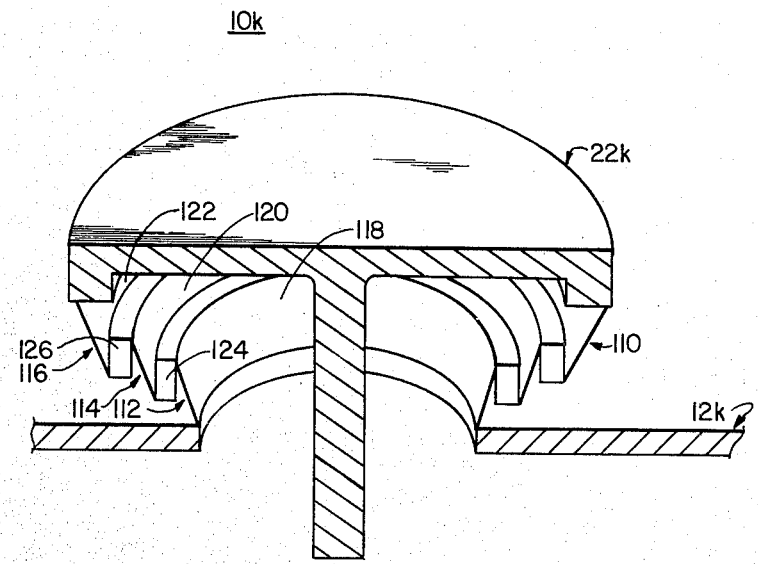
FIG. 6 is an axonometric view of an alternative construction of a folded RCC according to this invention.
Figure 7:
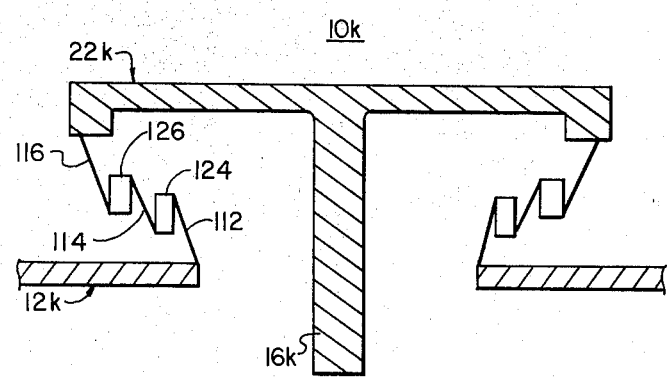
FIG. 7 is a schematic sectional elevational diagram of the folded RCC shown in FIG. 6.

In an alternative construction, folded RCC 10K, FIGS. 6 and 7, includes a single pleated member 110 which forms a plurality of stages 112, 114, 116, each of which contains flexure means 118, 120, 122, adjacent ones of which are interconnected by intermediate sections 124 and 126. Flexure means 118, 120 and 122 may be arranged along radii each from a different focus or all from the same focus, as previously explained. Further, intermediate sections 124 and 126 may be designed to be flexible so that they can provide at least a portion of the deformable function of structure 22k.

Other embodiments will occur to those skilled in the art and are within the following claims:

What is claimed is:

1. A folded remote center compliance device including first and second structures serially connected between a mounting member and an operator member for enabling translational motion and rotational motion of said operator member about a remote center at, near or beyond the end of said operator member; one of said structures including at least two stages connected in series, each stage including flexure means disposed along radii from a focus, a first of said stages being connected with the other of said structures and a second of said stages being connected with one of said members, the other of said members being connected with the other of said structures, and an intermediate section for interconnecting flexure means in adjacent stages.

2. The device of claim 1 in which said flexure means in each stage includes at least three discrete flexure elements.

3. The device of claim 1 in which said flexure means in each stage is flexible throughout.

4. The device of claim 1 in which said flexure means in each stage is flexible at specific portions.

5. The device of claim 1 in which said flexure means in each stage is disposed along radii from the same focus.

6. The device of claim 1 in which said flexure means in each stage is disposed along radii from different foci.

7. The device of claim 5 in which said focus is coincident with said remote center.

8. The device of claim 6 in which one of said foci is coincident with said remote center.

9. The device of claim 1 in which said stages are formed of a pleated member in which one part of each pleat includes a flexure means and the other part an intermediate section.

* * * * *